United States Patent [19]

Brodeur

[11] 4,318,105
[45] Mar. 2, 1982

[54] LORAN-C NAVIGATION APPARATUS

[75] Inventor: Lester R. Brodeur, Nashua, N.H.

[73] Assignee: Sanders Associates, Inc., Nashua, N.H.

[21] Appl. No.: 22,661

[22] Filed: Mar. 22, 1979

Related U.S. Application Data

[63] Continuation of Ser. No. 842,706, Oct. 17, 1977, abandoned.

[51] Int. Cl.³ ............................................... G01S 1/24
[52] U.S. Cl. .................................... 343/103; 364/452
[58] Field of Search ......................... 343/103; 364/452

[56] References Cited

U.S. PATENT DOCUMENTS

| | | | |
|---|---|---|---|
| 3,868,691 | 2/1975 | Miller et al. | 364/452 |
| 3,947,849 | 3/1976 | Fehlner et al. | 343/103 |
| 4,134,117 | 1/1979 | Robinson et al. | 343/103 |

Primary Examiner—Theodore M. Blum
Attorney, Agent, or Firm—Louis Etlinger; Ronald Reichman

[57] ABSTRACT

LORAN-C navigation apparatus is disclosed wherein digital circuitry and a microprocessor is used to automatically identify LORAN transmitting stations and makes standard hyberbolic navigation measurements. The equipment operator manually enters the group repetition rate into the apparatus for a LORAN-C chain covering the area within which the navigation apparatus is being operated. Initially, the apparatus searches all incoming signals until signals from a master station are received regularly at the stored group repetition rate. The apparatus then closely determines the time of arrival of signals from the secondary stations of the selected LORAN-C chain before changing to a fine search mode in which the exact time of arrival of the secondary station signals is determined; the phase code of the received signals is checked to determine if the received signal is a ground or sky wave, and a determination is made if there is a defective secondary station blink code. The time difference of arrival measurements are then output visually to be plotted in a well known manner on a LORAN-C chart to locate the position of the craft upon which the apparatus is located.

17 Claims, 9 Drawing Figures

LORAN-C NAVIGATION APPARATUS

This is a continuation of application Ser. No. 842,706, filed Oct. 17, 1977, now abandoned.

FIELD OF THE INVENTION

This invention relates to navigational equipment and more particularly to hyperbolic navigational equipment utilizing the time difference in the propagation of radio frequency pulses from synchronized ground transmitting stations.

BACKGROUND OF THE INVENTION

Throughout maritime history navigators have sought an accurate reliable method of determining their position on the surface of the earth and many instruments such as the sextant were devised. During the second world war, a long range radio-navigation system, LORAN-A, was developed and was implemented under the auspices of the U.S. Coast Guard to fulfill wartime operational needs. At the end of the war there were seventy LORAN-A transmitting stations in existence and all commercial ships, having been equipped with LORAN-A receivers for wartime service, continued to use this navigational system. This navigational system served its purpose but shortcomings therein were overcome by a new navigational system called LORAN-C.

Presently, there are eight LORAN-C multi-station transmitting chains in operation by 1980. This new navigational system will result in an eventual phase-out of the earlier LORAN-A navigational system.

LORAN-C is a pulsed low-frequency (100 kilohertz), hyperbolic radio navigation system. LORAN-C radio navigation systems employ three or more synchronized ground stations that each transmit radio pulse chains having, at their respective start of transmissions, a fixed time relation to each other. The first station to transmit is referred to as the master station while the other stations are referred to as the secondary stations. The pulse chains are radiated to receiving equipment that is generally located on aircraft or ships whose position is to be accurately determined. The pulse chains transmitted by each of the master and secondary stations is a series of pulses, each pulse having an exact envelope shape, each pulse chain transmitted at a constant precise repetition rate, and each pulse separated in time from a subsequent pulse by a precise fixed time interval. In addition, the secondary station pulse chain transmissions are delayed a sufficient amount of time after the master station pulse train transmissions to assure that their time of arrival at receiving equipment anywhere within the operational area of the particular LORAN-C system will follow receipt of the pulse chain from the master station.

Since the series of pulses transmitted by the master and secondary stations is in the form of pulses of electromagnetic energy which are propagated at a constant velocity, the difference in time of arrival of pulses from a master and a secondary station represents the difference in the length of the transmission paths from these stations to the LORAN-C receiving equipment.

The focus of all points of a LORAN-C chart representing a constant difference in distance from a master and a secondary station, and indicated by a fixed time difference of arrival of their 100 kilohertz carrier pulse chains, described a hyperbola. The LORAN-C navigation system makes it possible for a navigator to exploit this hyperbolic relationship and precisely determine his position using a LORAN-C chart. By using a moderately low frequency such as 100 kilohertz, which is characterized by low attenuation, and by measuring the time difference between the reception of the signals from master and secondary stations, the modern-day LORAN-C system provides equipment position location accuracy within two hundred feet and with a repeatability of within fifty feet.

The theory and operation of the LORAN-C radio navigation system is described in greater detail in an article by W. P. Frantz, W. Dean, and R. L. Frank entitled "A Precision Multi-Purpose Radion Navigation System," 1957 I.R.E. Convention Record, Part 8, page 79. The theory and operation of the LORAN-C radio navigation system is also described in a pamphlet put out by the Department of Transportation, U.S. Coast Guard, No. CG-462, dated August, 1974, and entitled "LORAN-C User Handbook".

The LORAN-C system of the type described in the aforementioned article and pamphlet and employed at the present time, is a pulse type system, the energy of which is radiated by the master station and by each secondary station in the form of pulse trains which include a number of precisely shaped and timed bursts of radio frequency energy as priorly mentioned. All secondary stations each radiate pulse chains of eight discrete time-spaced pulses, and all master stations transmit the same eight discrete time-spaced pulses but also transmit an identifying ninth pulse which is accurately spaced from the first eight pulses. Each pulse of the pulse chains transmitted by the master and secondary stations has a 100 kilohertz carrier frequency, so that it may be distinguished from the much higher frequency carrier used in the predecessor LORAN-A system.

The discrete pulses radiated by each master and each secondary LORAN-C transmitter are characterized by an extremely precise spacing of 1,000 microseconds between adjacent pulses. Any given point on the precisely shaped envelope of each pulse is also separated by exactly 1,000 microseconds from the corresponding point on the envelope of a preceding or subsequent pulse within the eight pulse chains pulses. To insure such precise time accuracy, each master and secondary station transmitter is controlled by a cesium frequency standard clock and the clocks of master and secondary stations are synchronized with each other.

As mentioned previously, LORAN-C receiving equipment is utilized to measure the time difference of arrival of the series of pulses from a master station and the series of pulses from a selected secondary station, both stations being within a given LORAN-C chain. This time difference of arrival measurement is utilized with special maps having time difference of arrival hyperbola information printed thereon. These maps are standard LORAN-C hydrographic charts prepared by the U.S. Coast Guard and the hyperbola curves printed thereon for each secondary station are marked with time difference of arrival information. Thus, the difference in time arrival between series of pulses received from a master station and selected ones of the associated secondary stations must be accurately measured to enable the navigator to locate the hyperbola on the chart representing the time difference measured. By using the time difference of arrival information between a master station and two or more secondary stations, two or more corresponding hyperbolae can be located on the chart and their common point of intersection accurately identifies the position of the LORAN-C receiver. It is clear that any inaccuracies in measuring time difference of arrival of signals from master and secondary transmitting stations results in position determination errors.

There are other hyperbolic navigation systems in operation around the world similar to LORAN-C, and with which my novel receiver can readily be adapted to operate by one skilled in the art. There is a LORAN-D system utilized by the military forces of the United States, as well as the aforementioned LORAN-A system. Others are DECCA, DELRAC, OMEGA, CYTAC, GEE and the French radio WEB, all of which operate in various portions of the radio frequency spectrum and provide varying degrees of positional accuracy.

LORAN-C receiving equipment presently in use is relatively large in size, heavy and requires relatively large amounts of power. In addition, present LORAN-C receivers are relatively expensive and, accordingly, are found only on larger ships and aircraft. Due to the cost, size, weight, and power requirements of present LORAN-C receiving equipment, such equipment is not in general use on small aircraft, fishing boats and pleasure boats. In addition, LORAN-C receiving equipment presently in use required anywhere from five to ten minutes to warm up and provide time difference measurement information. Further, present LORAN-C equipment is rather complex, having many controls, and the operator thereof usually must have some training in the use of the equipment.

Thus, there is a need in the art for a new LORAN-C receiver that is small, light in weight, has few controls and is therefore easy to operate by inexperienced people, requires a small amount of electrical power, and is relatively low in cost. Such equipment would fill the needs of those who do not now have LORAN-C receiving equipment.

SUMMARY OF THE INVENTION

The foregoing needs of the prior art are satisfied by my novel LORAN-C receiver. I eliminate much of the complex and costly automatic acquisition and tracking circuitry in prior art LORAN-C navigation receivers and provide a small, light weight, inexpensive receiver using relatively little electrical power.

Four thumbwheel switches on my LORAN-C equipment are used by the operator to enter the group repetition rate information for a LORAN-C chain covering the area within which the LORAN-C equipment is being operated. This information entered via the thumbwheel switches is used by an internal microprocessor to locate the signals from the master and secondary stations of the chosen LORAN-C chain.

The receiver of my equipment receives all signals that appear within a small bandwidth centered upon the 100 Khz. operating frequency of the LORAN-C network. A digital register coupled with logic circuitry is then used to continuously check all received signals to search for the unique pulse trains transmitted by the master and secondary stations. The microprocessor internal to my novel LORAN-C equipment analyzes all signals output from the register and logic circuitry indicating that signals from master or secondary stations have been received to first determine if they match the group repetition rate for the selected LORAN-C chain and then to develop a histogram of the time of arrival of the signals from the secondary stations. Once the equipment has approximately located and is receiving the pulse trains from the selected master and secondary stations, the microprocessor causes other circuitry to go into a fine search mode.

In the fine search mode the microprocessor disables the equipment from analyzing any signals other than those received within 35 microseconds of the approximate time of arrival of the signals from the secondary stations as determined using the histogram. The microprocessor also enables other equipment to analyze the phase of each pulse and to locate the third cycle zero crossing point of each received pulse. In the event the third cycle zero crossing of a pulse is not located at the approximate time indicated by the microprocessor, the analyzation circuitry indicates to the microprocessor whether to add or subcontract 10 microseconds to the approximate time of arrival and then repeats the analyzation process. This analyzation process and shifting of the approximate search point is repeated until the third cycle zero crossing of the desired pulse of the selected master and secondary station pulse trains is located. Using an accurate crystal controlled clock internal to my novel equipment, the microprocessor then makes accurate time difference of arrival measurements between the time of arrival of signals from the master station of the selected chain and the arrival of the pulse trains from the secondary stations. The equipment operator utilizes other thumbwheel switches to indicate two secondary stations, the time difference of arrival information to be visually displayed. The operator of the LORAN-C equipment utilizes these two read-outs using a LORAN-C hydrographic chart to locate the physical position of the navigation equipment on the surface of the earth.

In an alternative embodiment of my invention a front panel keyboard may be utilized rather than thumbwheel switches and the microprocessor can be programmed to perform other functions including, but not limited to, use as a calculator. Other possible uses are limited only by the amount of storage provided within the microprocessor or auxiliary memory adjunct to the processor in a well known manner, and by the imagination of the equipment designer.

The operator of my novel LORAN-C navigation receiver can quickly and easily calibrate the receiver master oscillator, unlike prior art receivers. To accomplish this, the operator places the equipment in a calibration mode wherein the output of the oscillator is compared against the group repetition interval [GRI] information which has been entered via the thumbwheel switches. The display is used to indicate to the operator if the equipment is in calibration or requires a simple adjustment by the operator.

The Applicant's novel LORAN-C navigation receiver will be better understood upon a review of the detailed description given hereinafter in conjunction with the drawing in which:

BRIEF DESCRIPTION OF THE DRAWINGS

FIGS. 5, 6, and 7 are detailed block diagrams of the Applicant's navigation receiver;

GENERAL DESCRIPTION

Figure 2:
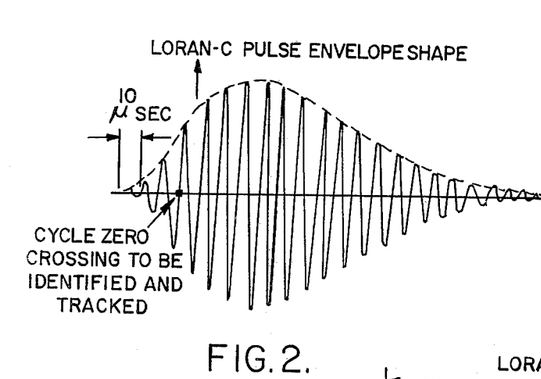
FIG. 2 shows the shape of each pulse of the pulse trains transmitted by all LORAN-C master and secondary stations.

To understand the general or detailed operation of my novel LORAN-C receiver, it is best to first understand the makeup of the signals transmitted by LORAN-C stations and being received by my novel receiver. Representation of these signals are shown in FIGS. 2 and 3 which will now be discussed.

Figure 3:
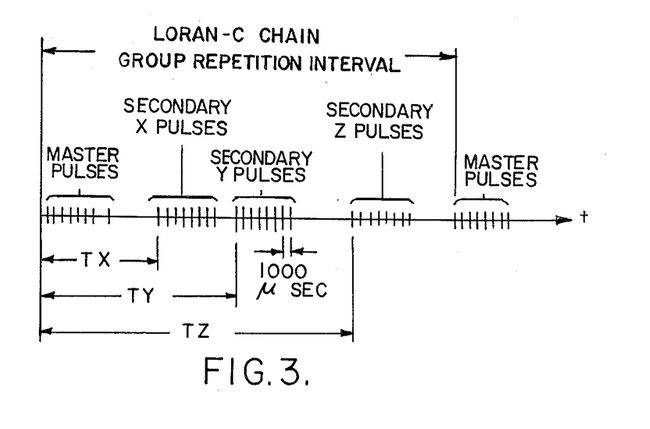
FIG. 3 is a graphical representation of the pulse trains transmitted by the master and secondary stations within a LORAN-C chain.

All master and secondary stations transmit groups of pulses as briefly mentioned above, at a specified group repetition interval which is defined as shown in FIG. 3. Each pulse has a 100 Khz. carrier and is of a carefully selected shape shown in FIG. 2. For each LORAN-C chain a group repetition interval (GRI) is selected of sufficient length so that it contains time for transmission of the pulse chains from the master station and each associated secondary station, plus time between the transmission of each pulse train from the master station so that the signals received from two or more stations within the chain will never overlap each other when received anywhere in the LORAN-C chain coverage area. Each station transmits one pulse chain of eight or nine pulses per GRI as shown in FIG. 3. The master station pulse chain consists of eight pulses, each shaped like the pulse shown in FIG. 2, with each of the eight pulses spaced exactly 1,000 microseconds apart, and with a ninth pulse spaced exactly 2,000 microseconds after the eighth pulse. The pulse chain for each of the secondary stations X, Y and Z contains eight pulses shaped as shown in FIG. 2, and each of the eight pulses is also spaced exactly 1,000 microseconds apart. The pictorial representation of the pulses transmitted by the master station and the three secondary stations X, Y and Z associated therewith shown in FIG. 3 shows that the pulse trains never overlap each other and all are received within the group repetition interval. FIG. 3 also shows a representative time difference of arrival of the pulse train from each of the secondary stations with respect to the master station. These time difference of arrival figures are designated Tx, Ty and Tz and are the time differences measured using my receiver.

It is to be recognized that the time difference of arrival between reception of the pulse train from the master station and the pulse trains from each of the X, Y and Z secondary stations will vary depending upon the location of the LORAN-C receiving equipment with the coverage area of a LORAN-C chain. In addition, the signal strength of the received signals from the master and secondary stations will also vary depending upon the location of the receiving equipment, as represented by the different heights of the representative pulse lines shown in FIG. 3.

The delayed or spaced ninth pulse of each master station not only identifies the pulse train as being from a master station, but the ninth pulse is also turned on and off by the Coast Guard in a "blink" code, well known in the art, to indicate particular faulty secondary stations in a LORAN-C chain. These "blink" codes are published by the Coast Guard on the LORAN-C charts.

In World War II when the LORAN-C systems were installed, carrier phase coding was used as a military security method, but after the war when the need for military security ceased, the phase coding was called a skywave unscrambling aid. In skywave unscrambling the 100 Khz. carrier pulses from the master station and the secondary stations in a LORAN-C chain are changed in phase to correct for skywave interference in a manner well known in the art. Skywaves are echoes of the transmitted pulses which are reflected back to earth from the ionosphere. Such skywaves may arrive at the LORAN-C receiver anywhere between 35 microseconds to 1,000 microseconds after the ground wave for the same pulse is received. In the 35 microsecond case, the skywave will overlap its own groundwave while in the 1,000 microsecond case the skywave will overlap the groundwave of the succeeding pulse. In either case the received skywave signal has distortion in the form of fading and pulse shape changes, both of which can cause positional errors. In addition, a skywave may be received at higher levels than a ground wave. To prevent the long delay skywaves from affecting time difference measurements, the phase of the 100 Khz. carrier is changed for selected pulses of a pulse train in accordance with a predetermined pattern. These phase code patterns are published by the Coast Guard on the LORAN-C charts.

The exact pulse envelope shape of each of the pulses transmitted by all master and secondary stations is also very carefully selected to aid in measuring the exact time difference in arrival between a pulse train from a master station and a pulse train from a secondary station as is known to those skilled in the art. To make exact time difference measurement, one method the prior art teaches is superpositions matching pulse envelopes of pulses from a master station and a selected secondary station. Another method which I also utilize, is detection of a specific zero-crossing of the 100 Khz. carrier of the master and secondary station pulses.

Now that the reader has an understanding of the nature of the signals transmitted by the LORAN-C master and secondary stations and how they are used for navigation purposes, the reader can better understand the operation of my novel LORAN-C receiver which will now be described.

Figure 1:
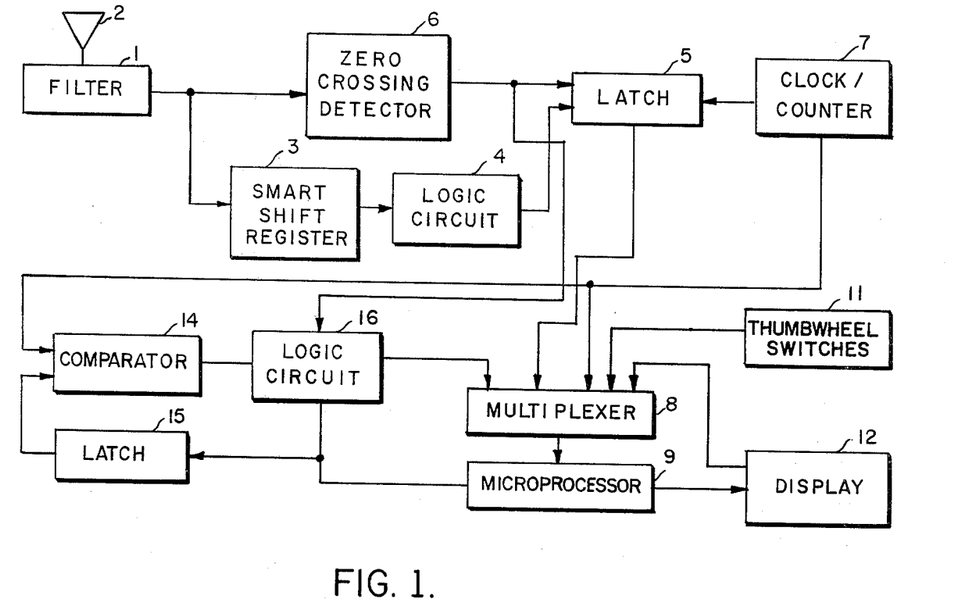
FIG. 1 is a general block diagram of the Applicant's LORAN-C navigation receiver.

In FIG. 1 is seen a general block diagram of my novel LORAN-C navigation equipment. Filter and preamplifier 1 and antenna 2 are of a conventional design of the type used in all LORAN-C receivers and is permanently tuned to a center frequency of 100 Khz., which is the operating frequency of all LORAN-C transmitting stations. Filter 1 has a bandpass of 20 Kilohertz. Received signals are applied to smart shift register 3 and zero crossing detector 6.

The signal input to zero crossing detector 6 is first amplitude limited so that each cycle of each pulse is represented by a binary one and each negative half cycle is represented by a binary zero. The leading or positive edge of each binary one exactly corresponds to the positive slope of each sine wave comprising each pulse. Thus, detector 6 is a positive zero-crossing detector. As will be described in detail further in this specification logic circuit 16 also provides an input to zero crossing detector 6, not shown in FIG. 1, which sets a 10 microsecond window only within which the leading edge of each binary 1 may be detected. The end result is that only the positive zero-crossing of the third cycle of each pulse of the train pulse trains transmitted by each LORAN-C station is detected and an output provided by detector 6.

It can be seen that latch 5 has inputs from zero crossing detector 6 and logic circuit 4. Clock/counter 7 is a crystal controlled clock which is running continuously while my novel LORAN-C receiver is in operation. The count present in counter 7 at the moment that zero crossing detector 6 indicates a third cycle positive zero crossing is stored in latch 5, the contents of which are then applied to multiplexer 8. Multiplexer 8 is a time division multiplexer used to multiplex the many leads from logic circuit 16, latch 5, clock/counter 7, thumbwheel switches 11, 61 and 62 through to microprocessor 9. The count in latch 5 indicates to microprocessor 9 the time at which each positive zero crossing is detected.

Smart shift register 3 has a filter at its input causing it to receive the output from receiver 1 within a narrower bandpass of five kilohertz centered on the carrier frequency of 100 Khz. The signal input to register 3 is also amplitude limited so that a pulse train of 1's and 0's is produced that is input to a shift register therein which is shifted at a 100 Khz. rate. Because of the 100 Khz. shifting frequency only the pulse trains from LORAN-C master and secondary stations will result in outputs from each of the individual stages of the shift register internal to smart shift register 3. Logic circuitry within register 3 is used to analyze the contents of the shift register internal to register 3 to first determine if the signals represent a pulse train from a LORAN-C station, secondly to determine if the pulse train is from a master or a secondary station, and finally to indicate the particular phase coding of the signals being received from a LORAN-C station. Logic circuit 4 includes a latch and a circuit to store information from register 3 indicating whether a pulse train is from a master or a secondary station and further indicating the phase code transmitted. This information stored within the latch of logic circuit 4 is applied to microprocessor 9 via multiplexer 8 for use in processing received LORAN-C signals. At the same time the information is stored on the latch within logic circuit 4 there is an output from circuit 4 enabling latch 5 to store the count in clock/counter 7 which will indicate the time of occurrence. It should be noted that clock/counter 7 also has an input to multiplexer 8 so that microprocessor 9 can keep track of a continuous running time as indicated by recycles of counter 7.

The output of thumbwheel switches 11 are also input to multiplexer 8 allowing the operator of my novel LORAN-C equipment to input the group repetition rate of a selected LORAN-C chain to microprocessor 9. The group repetition rate is also called the Group Repetition Interval (GRI). In alternative embodiments of my invention thumbwheel switches 11 may be replaced by a keyboard which can be used by the operator to access microprocessor 9 to do many things including perform navigation calculations.

With the various types of information being input to microprocessor 9 via multiplexer 8 from the circuits previously described, microprocessor 9 determines if and when signals being received via filter 1 are from the master and secondary stations of the selected LORAN-C chain. Once the microprocessor 9 locates the signals from the selected master station, as determined by a match of the GRI number input thereto via the four thumbwheel switches 11 with the difference in time arrival between each pulse train transmitted by the selected master station, microprocesor 9 similarly locates the corresponding secondary station signals. To locate the secondary stations microprocessor 9 creates a histogram from time of arrival information of any and all secondary station signals which are stored in twenty bins or slots created by the microprocessor in its own memory between the arrival of any two consecutive master station pulse trains. When signals from the secondary stations of the selected LORAN-C chain are located by secondary station signal counts appearing in the histogram bins at the same rate as the GRI of the selected LORAN-C chain, the microprocessor 9 performs a finer search by creating histogram bins of a shorter time duration. Each of the histrogram bins in which are stored the time of arrival counts of the signals of the appropriate secondary stations is then subdivided by microprocessor 9 into one hundred smaller time slot histogram bins to more closely determine the time of arrival of the pulse trains from the secondary stations of the selected LORAN-C chain. Each of these smaller histogram bins or slots stores counts corresponding to the time of receipt of signals received in consecutive twelve microsecond periods. In this manner, microprocessor 9 closely determines the time of arrival of pulse trains from the master and secondary stations of the selected LORAN-C chain within twelve microsecond periods.

Once microprocessor 9 determines the particular twelve microsecond histogram time slots in which the secondary station signals are being received, the microprocessor causes an enable timing signal which causes the equipment to go into a fine search mode utilizing logic circuit 16 to accurately find the third cycle positive zero crossing of each pulse of the selected master and secondary station pulse trains. To accomplish this function, the approximate time of arrival of sequentially received pulses of the master and secondary station pulse trains are sequentially entered into latch 15 and the contents thereof are applied to comparator 14. Comparator 14 compares the contents of latch 15 with the contents of clock/counter 7 and upon there being a match, comparator 14 provides an output signal to logic circuit 16. The time entered into latch 15 is actually a time calculated to be 35 microseconds before the time of arrival of each pulse of the pulse train from a selected secondary station. The output from comparator 14 to logic circuit 16 is used to store three timing signals therein which are received from microprocessor 9. These three timing signals represent lines which occur 2.5 microseconds, 12.5 microseconds, and 30.0 microseconds after the output signal from comparator 14. At the end of each of these three timed sequences, the phase coding of a received pulse is checked against phase coding permanently stored in microprocessor 9. With the phase coding information, microprocessor 9 is able to accurately locate the third cycle zero crossing of each pulse of the pulse trains from the master and secondary stations. In the event that the previously described signal characteristics immediately prior to and at fixed points during a pulse are not received, microprocessor 9 knows that there is an error in its calculated time placed in latch 15 and microprocessor 9 either increases or decreases the calculated time of subsequent pulse trains by 10 microseconds and the new calculated time figure is placed in latch 15. Logic circuit 16 again analyzes incoming signals at the aforementioned points. This process of adding or subtracting 10 microseconds to the calculated time is repeated until microprocessor 9 accurately locates the third positive zero crossing of each pulse of the pulse trains transmitted by each of the master and secondary stations of the selected LORAN- C chain; then determines if the received pulse trains are from a master or a secondary station, and further determines the particular skywave phase code being transmitted by each of the stations.

Once microprocessor 9 functioning with the other circuits in my LORAN-C receiver has located and locked onto the pulse trains being transmitted by the master and secondary stations of the selected LORAN-C chain and has made the desired time difference of arrival measurement that is required in LORAN-C operation, microprocessor 9 causes a visual indication to be given to the equipment operator via display 12. The output information is plotted on a LORAN-C hydrographic chart in a well known manner to locate the physical position of the LORAN-C receiver.

DETAILED DESCRIPTION

Turning now to describe in detail the operation of my novel LORAN-C equipment.

In FIG. 2 is seen the shape or waveform of every pulse transmitted by both master and secondary LORAN-C stations. The waveform of this pulse is very carefully chosen to aid in the detection of the third carrier cycle zero crossing in a manner well known in the art. One method known in the art is to take the first derivative of the curve represented by the envelope of the pulse shown in FIG. 2, and this first derivative clearly indicates a point at 25 microseconds from the beginning of the pulse. The next zero crossing following this indication is the desired zero crossing of the third cycle of the carrier frequency. Similar to the prior art method just described, my novel LORAN-C receiver detects the third zero crossing for each pulse of the master station and each secondary station. The precise time difference of arrival measurements to be made utilizing a LORAN-C receiver are made by measuring from the third cycle zero crossing of the fifth pulse of the master station pulse train and the third carrier cycle zero crossing of the fifth pulse of the manually selected secondary station.

In FIG. 3 is shown a representation of the nine pulse and eight pulse signals transmitted by a master station and the secondary stations of a LORAN-C chain. The small vertical lines each represent a pulse waveform such as shown in FIG. 2. The height of the vertical lines represents the relative signal strength of the pulses as received at a LORAN-C receiver. It can be seen that the signal strength of the pulses from the master station and each of the secondary stations are not identical.

It can be seen in FIG. 3 that the group repetition interval (GRI) is defined as the period between the first pulses of two consecutive master station pulse trains for a given LORAN-C chain. This information is found on standard LORAN-C hydrographic charts and is used to calibrate the oscillator in my novel LORAN-C receiver as will be described to greater detail further in this specification.

In a manner well known in the art, LORAN-C receiving equipment is used to measure the time difference of arrival between the pulse train from a master station pulse train and the pulse trains from two or more secondary stations associated with the master station. This time difference of arrival information is shown on FIG. 3 as $T_x$, $T_y$, and $T_z$.

Figure 4:
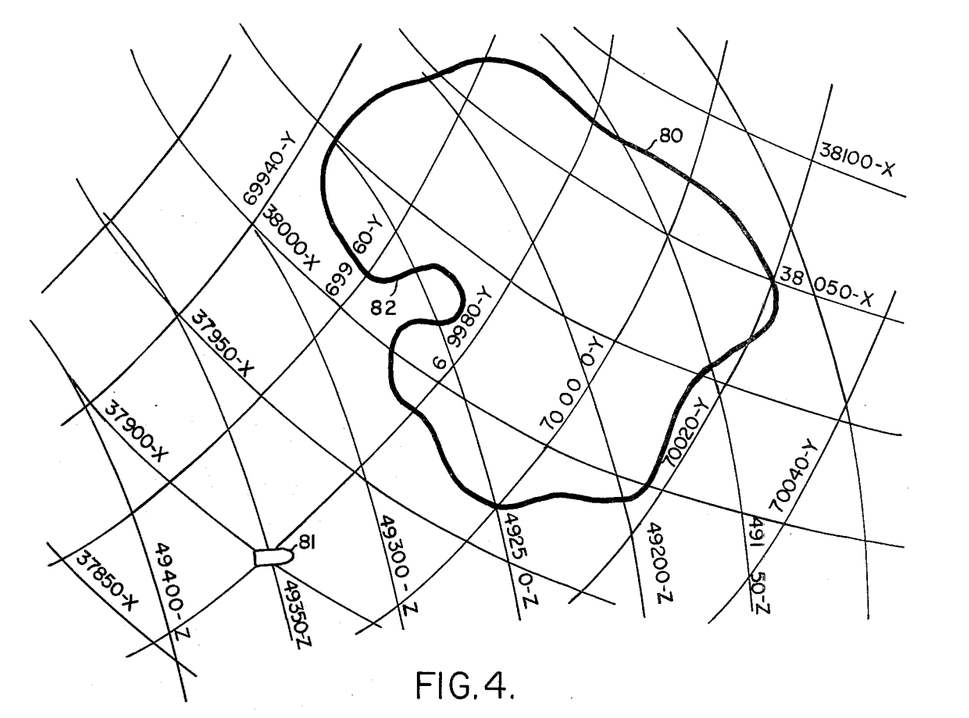
FIG. 4 is a representation of a portion of a LORAN-C navigation chart.

In FIG. 4 is shown a representative figure of a LORAN-C hydrographic chart. On this chart are shown three sets of arcuate curves, each set of curves having a five digit number thereon and suffixed by one of the letters, x, y or z. The numbers directly correspond to the time difference of arrival information $T_x$, $T_y$ and $T_z$ shown in FIG. 3 and measured by a LORAN-C receiver. In FIG. 3 the particular secondary station with which a set of the arcuate curves is associated is indicated by the suffix x, y, or z after the numbers on the curves.

LORAN-C charts show land masses such as island 80 on FIG. 4. For an example, the operator of my LORAN-C receiver located on boat 81 near island 80 would measure the time difference of arrival information between the master station and at least two of the three secondary stations in the LORAN-C chain. The operator, in making a measurement with respect to the X secondary station would measure 379000 on my LORAN-C receiver. As can be seen in FIG. 4, the line of position (LOP) 379000 is shown passing through boat 81. In a similar manner, the operator would measure the time difference arrival information with respect to the Y secondary station and would come up with the number 699800 on the receiver. Again, the LOP for this receiver reading passes through boat 81. If the operator of the LORAN-C receiver measures the time difference of arrival information with respect to the Z secondary station the reading would show 493500 and the LOP for this reading also passes through boat 81. Thus, the operator can accurately fix the position of boat 81 on the LORAN-C chart. From this position information on the map of FIG. 4, boat 81 may, for example, be accurately navigated toward harbor 82 of island 80.

It will be noted that the sample LORAN-C chart shown in FIG. 4 has only five digits on each LOP, but my LORAN-C receiver, has six digits. The lowest order or sixth digit is used to interpolate between two LOPs on the LORAN-C chart in a manner well known in the art. In the simple example given above, boat 81 is located exactly on three LOPs so no interpolation need be done to locate a LOP between those shown on the chart of FIG. 4. Thus, it should be noted that the six digit numbers obtained utilizing my equipment each included an extra zero suffixed to the end of the five digit LOP numbers shown on the LORAN-C chart. A sixth digit other than zero on the receiver would require interpolation between the LOP lines on the chart.

Figure 5:
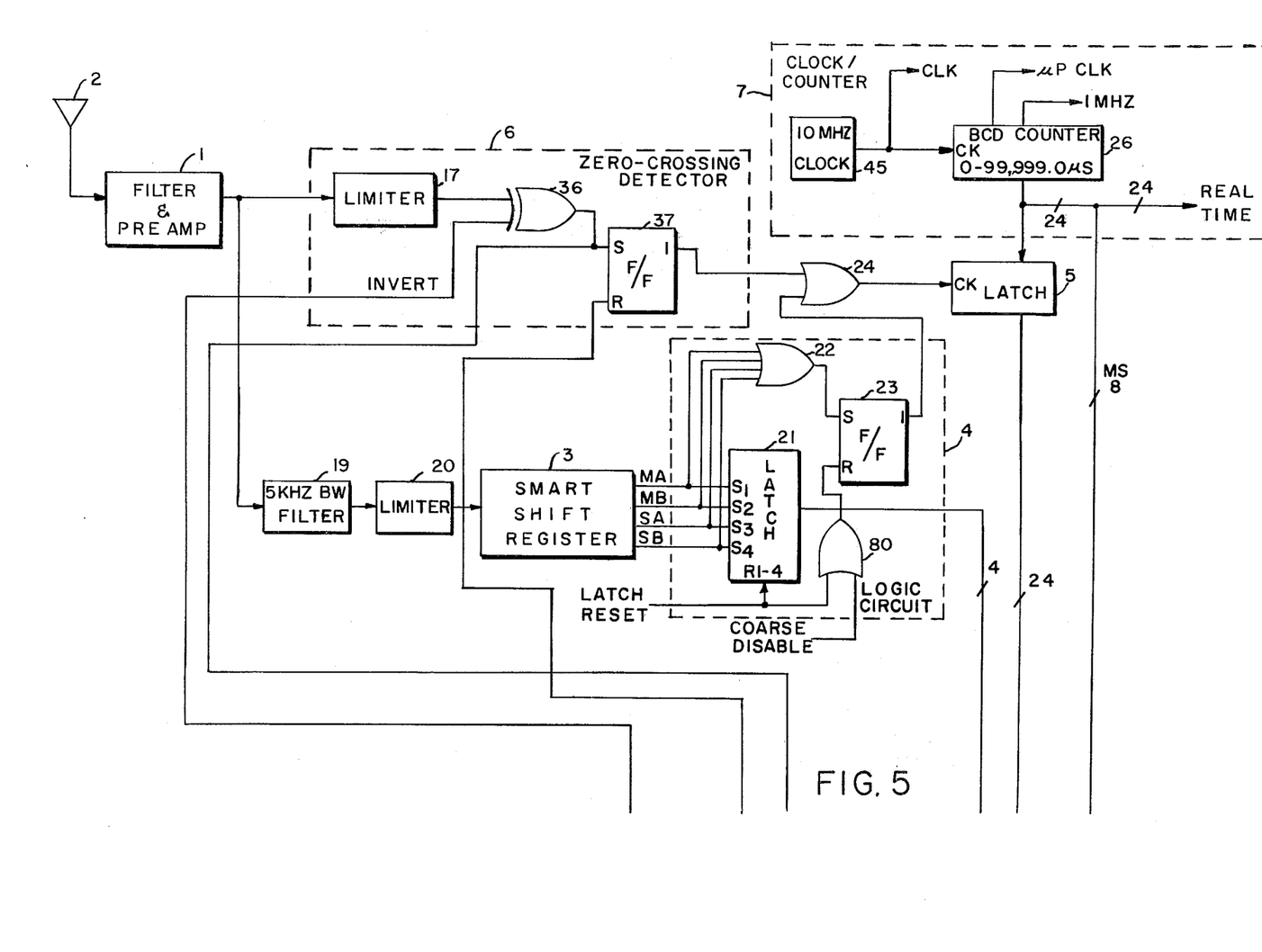
Figures 6, 9:
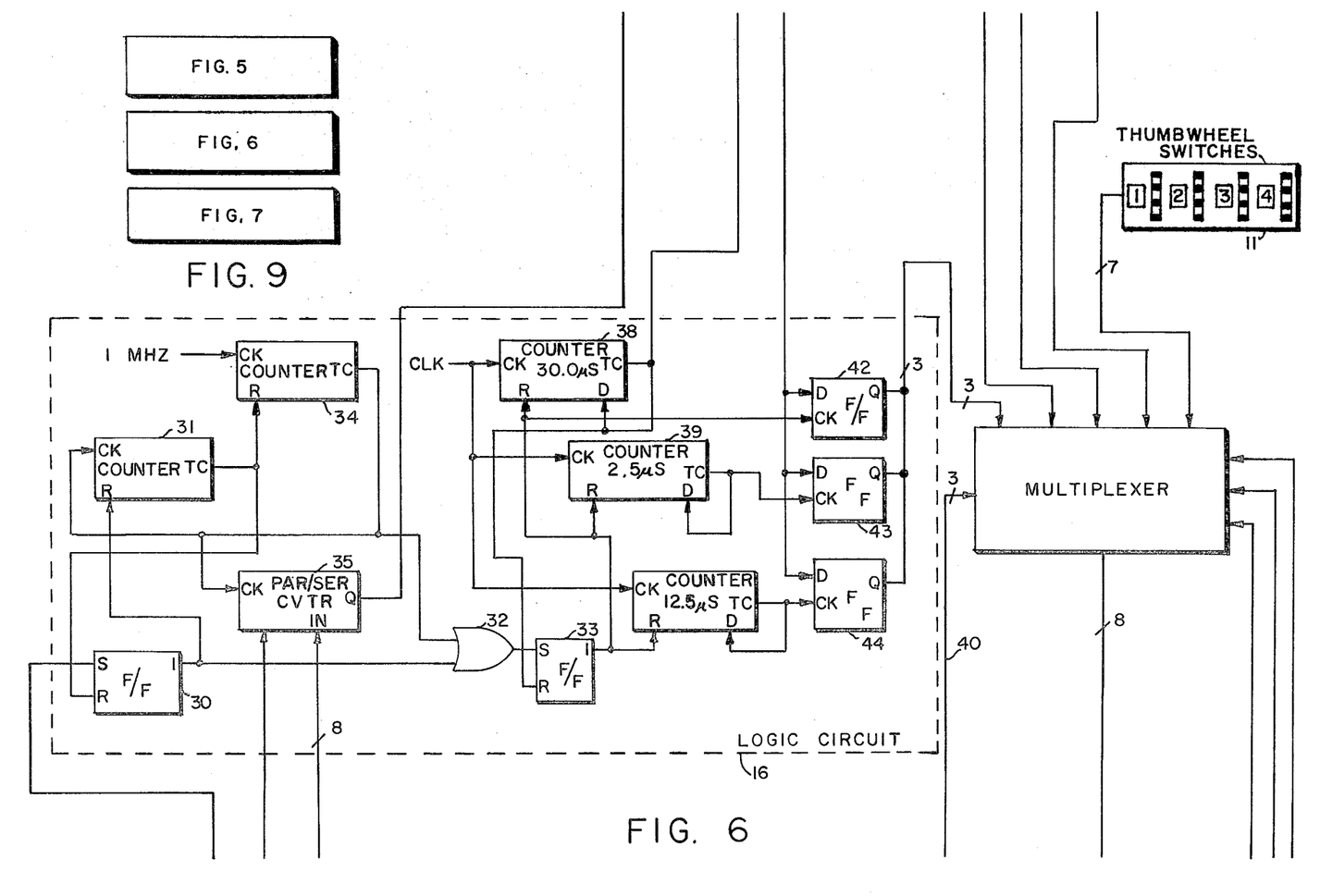
Figure 7:
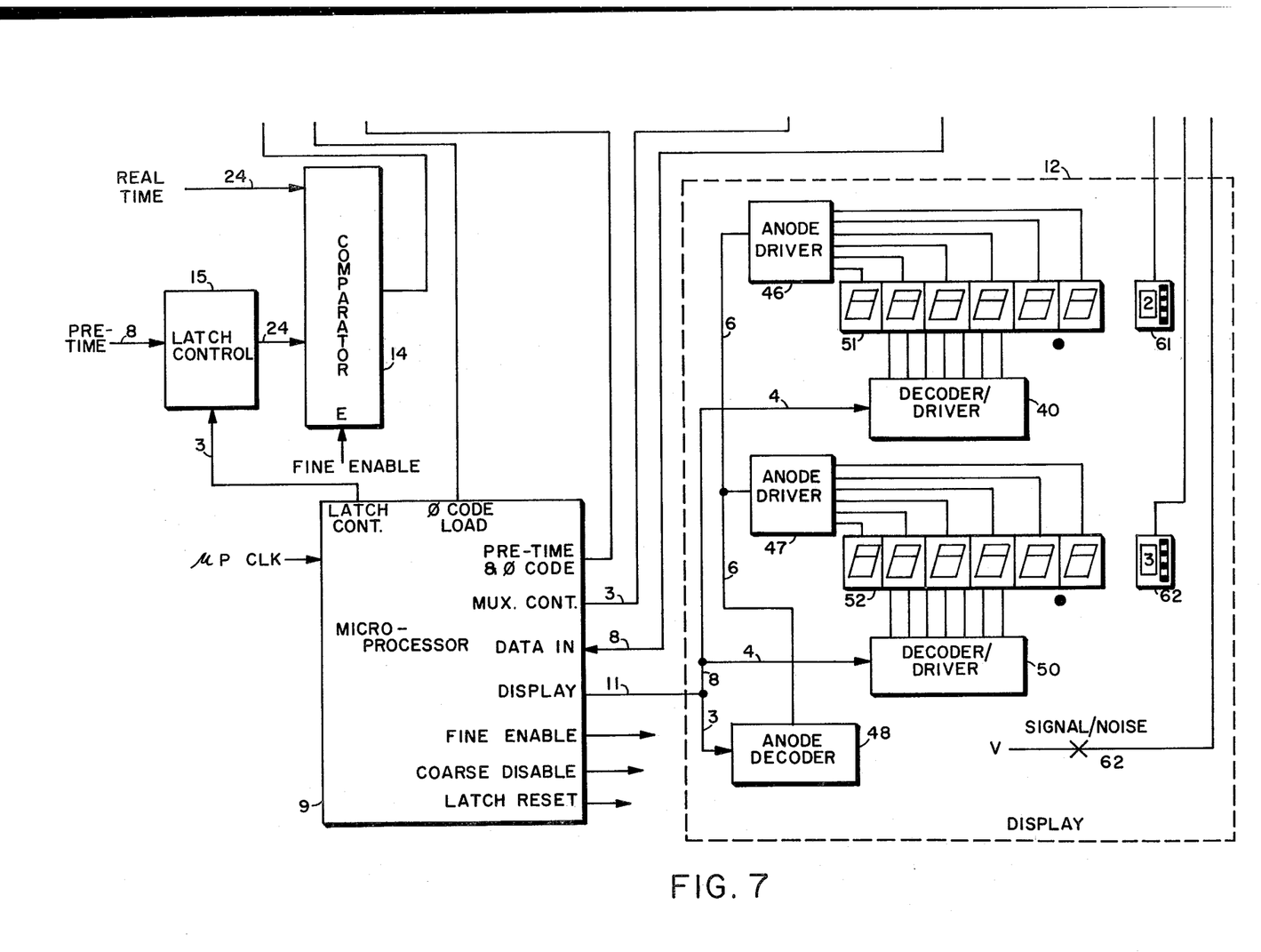

In FIGS. 5, 6, and 7 is shown a detailed block diagram schematic of my novel LORAN-C receiver which I will now describe in detail. FIGS. 5, 6, and 7 should be arranged as shown in FIG. 9 to best understand the description found hereinafter.

LORAN-C signals are received by a conventionally designed antenna 2 and conventionally designed filter and preamplifier 1, in a manner well known in the art. Interference caused by miscellaneous radio frequency signals and signals from other navigational systems are essentially eliminated by filter 1 which utilizes filters having a 20 Khz, bandwidth centered on 100 Khz, with a sharp drop off at either side of this band. Filter 1, being of a conventional design utilized in many LORAN-C receivers, is not described in further detail herein. Similarly, the choice of antenna 2 and/or the design thereof is also well known in the art and is not disclosed herein in detail for the purpose of not cluttering up the specification with details that are well known in the art and would detract from an understanding of the invention. The output from filter 1 is undemodulated and is applied to limiter 17 in zero crossing detector 6 and to 5 Khz, bandwidth filter 19.

Figure 8:
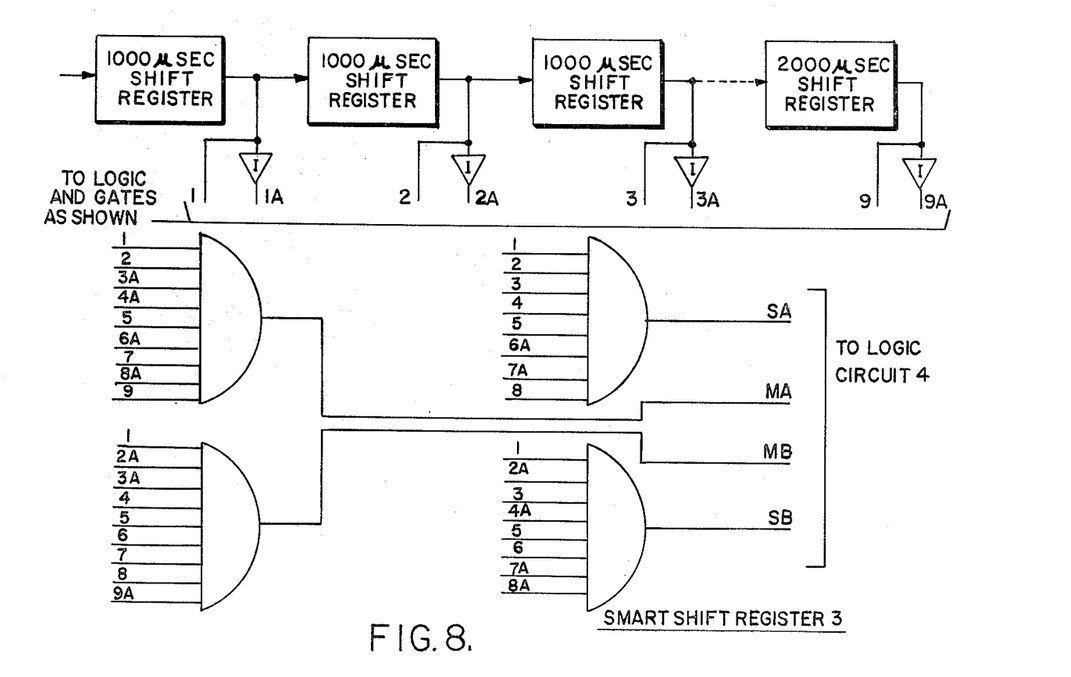
FIG. 8 is a detailed block diagram of the smart shift register shown in FIG. 5; and, FIG. 9 shows the manner in which FIGS. 4, 5, and 6 should be arranged with respect to each other when reading the detailed description.

When my novel LORAN-C equipment is initially placed in operation, it is in a coarse search mode wherein it is only trying to generally locate the pulse trains from the master and secondary stations of the selected chain. This function is accomplished by smart shift register 3 as now described. Filter 19 has a five Khz. bandwidth centered on the 100 Khz. carrier frequency of the LORAN-C signals and causes rejection of most spurious signals. LORAN-C signals and a few spurious signals are passed through filter 10 to limiter 20. Limiter 20 demodulates and hard limits the signals input thereto so that only a chain of binary 1's is output from the limiter. Each of the binary 1's output from limiter 20 corresponds to a spurious signal pulse or to each of the pulses in the pulse trains from master and secondary stations. These pulses are applied to smart shift register 3 which is shown in block diagram form in FIG. 5, but is shown in detail in FIG. 8 and will be described in detail further in this specification.

Smart shift register 3 is made up of ten serially connected shift registers, all of which are clocked or shifted at the same period as the pulses from master and secondary LORAN-C stations are received and logic gates. This is a one-thousand microsecond period as shown in FIG. 3. These ten shift registers store a window time sample of received signals which are analyzed to determine if the signal stored in the shift registers represents a pulse train from a LORAN-C master or secondary station. Due to the clocking the sample moves in time. The logic gates connected to various stages of shift registers provide outputs that are used to analyze the signals temporarily stored in the register to determine if received signals are from a master or secondary station and to determine if the received signals have what the U.S. Coast Guard refers to as group repetition interval A or B phase coding. These phase codes are well known to those skilled in the art. Upon smart shift register 3 determining that a pulse train has been received from a master or secondary station the internal logic gates, which are described in greater detail further in the specification, apply an output signal on one of leads MA, MB, SA, or SB, indicating if the signals are from a master or secondary station and the particular phase coding thereof. A signal indication that the received signals are from either a master or a secondary station is stored in latch 21. In addition, the last named signal output from register 3 is applied via OR gate 22 to the SET input of R/S flip-flop 23 to place this flip-flop in its set state with its 1 output high indicating that a pulse train from either a master or secondary station has been received. The 1 output of R/S flip-flop 23 is applied via OR gate 24 to latch 5. More particularly, this output signal from flip-flop 23 is applied to the clock input CK of latch 5 and causes the latch to store the contents of BCD counter 26 in clock/counter 7 at the moment in time that it is determined that signals have been received from the master or secondary station as indicated by the signal at input CK. The sored count is indicative of the real time at which the pulse train was received. As previously briefly described, the contents stored in latch 5 are applied to multiplexer 8 in FIG. 6 to thereafter be input to microprocessor 9.

Multiplexer 8 in FIG. 6 is required to input signals to microprocessor 9 in FIG. 7 due to the limited number of input terminals to microprocessor 9 and the large number of leads over which signals must be applied to the microprocessor. Multiplexer 8 accomplishes this task utilizing time division multiplexing techniques. Integrated circuit multiplexers are available on the market, but may also be made up of a plurality of two input logic AND gates, one input of each of which is connected to the leads on which are the signals to be multiplexed, and the other input of each of which is connected to a clock and counter arrangement which causes ones or groups of the logic gates to have their other inputs sequentially energized in a cyclic manner. In this embodiment of my invention multiplexer 8 comprises Texas Instrument TI74151 multiplexers.

It can be seen in FIG. 6 that there are inputs to multiplexer 8 from logic circuit 4, latch 5, clock/counter 7, thumbwheel switches 11, 61 and 62, logic circuit 16 and microprocessor 9. The signals input to multiplexer 8 from microprocessor 9 on leads 40 are used to control the operation of multiplexer 8.

The contents of BCD counter 26 which are stored in latch 5 in response to the receipt of a pulse train from a master or secondary station are applied via multiplexer 8 to microprocessor 9 and indicate to the microprocessor the time of receipt of a valid pulse train from a master or secondary station.

Following microprocessor 9 receiving the contents of latch 5 via multiplexer 8, indicating the time of receipt of a pulse train from a master or a secondary station, the microprocessor outputs a signal on LATCH RESET which is applied to reset latch 21 and clear the information stored therein in preparation of storing a subsequent master or secondary station indication. In addition, the CATCH RESET is applied via OR gate 60 to place flip-flop 23 in its reset state.

As signals being input to microprocessor 9 from latch 5 will represent the receipt of master and secondary station signals from more than one LORAN-C station chain, microprocessor 9 requires an input from the equipment operator using thumbwheel switches 11 to indicate a particular LORAN-C chain of interest. The operator first consults a LORAN-C hydrographic chart published by the U.S. Coast Guard and finds the group repetition interval (GRI) for the LORAN-C station chain of interest. Using the four switches 11 the operator enters the repetition rate or GRI.

As previously described, latch 5 is used to store the count present in BCD counter 25 each time a pulse train from a master or secondary station is detected by smart shift register 3. At the same time, the information stored in latch 21 is also applied to microprocessor 9 via multiplexer 8 to indicate the signal is from a master or secondary station and the phase coding thereof. In the previously mentioned initial coarse search mode microprocessor 9 analyzes master and secondary station information being input thereto via latch 5 to determine which indications represent signals from the stations of the selected LORAN-C chain. Microprocessor 9 stores the time of signal reception of the pulse trains from all master and secondary stations as indicated by the counts stored in latch 5 until it has definitely located and locked onto the selected stations and can therefore calculate the time of arrival of subsequent pulse chains therefrom.

The microprocessor is programmed to create twenty bins or slots each corresponding to one of twenty sequential time periods of approximately twelve hundred microseconds duration each. The count stored in latch 5 when logic circuit 4 indicates a pulse train has been received from a master or secondary station causes a count to be stored internal to microprocessor 9 in the corresponding one of the twenty slots or bins. The microprocessor 9 is programmed to store the counts stored in these twenty bins, which make up a histogram to determine which bins contain counts indicating receipt of master and secondary station pulse trains at the correct GRI.

Once microprocessor 9 is consistently receiving signals from the master station of the selected LORAN-C chain, it causes a front panel light designated "M" to be lit indicating that the receiver has locked onto the correct master station signals. As microprocessor 9 locates each secondary station associated with the selected LORAN-C chain, it causes a corresponding front panel light "51", "52", "53" and "54" to be lit as each secondary station is locked onto. This indicates to the operator which secondary stations are acceptable to use to make LORAN-C measurements. Microprocessor 9 then takes only the ones of the twenty histogram bins in which the selected chain master and secondary station signal counts are stored and subdivides each of these bins into one-hundred bins corresponding to sequential time slots of twelve microseconds duration each. The process just described is repeated for the shorter duration histogram bins created in memory internal to microprocessor 9 to more closely determine the time of arrival or receipt of the pulse trains from the secondary stations of the selected LORAN-C chain. When the above histogram processing has been accomplished to determine the time of receipt of master and secondary station pulse trains within twelve microseconds accuracy, microprocessor 9 generates an enable timing signal which causes the equipment to switch from the coarse search mode to a fine search mode to accurately make the LORAN-C time difference measurements as is described further in this specification.

To place the equipment in the fine search mode, microprocessor 9 outputs a signal on its output COARSE DISABLE. The last named signal is applied via OR gate 60 to the reset input R of flip-flop 23 which prevents signals from register 3 being applied to the set input S and placing flip-flop 23 in its set or one state. Microprocessor 9 also applies a signal to its FINE ENABLE output causing the equipment to go into the fine search mode wherein the time of arrival of subsequently received signals is accurately made and a readout is provided on display 12.

More particularly, the FINE ENABLE signal is applied to comparator 14 in FIG. 7 to enable same. One of the two inputs to comparator 14 is the output from BCD counter 25 in clock 7 on lead REAL TIME. The other input to comparator 14 is a number stored in latch 15 and this number is calculated by microprocessor 9 as is now described. Once microprocessor 9 determines the time of arrival of the signal trains from the master and secondary stations of the selected chain in the coarse search mode, and then switches to the fine search mode, it calculates the time of arrival of the subsequent pulse trains of the master and secondary stations from the secondary or fine (12 microsecond) histogram. Using the fine histogram, microprocessor 9 actually calculates a time 35 microseconds prior to the expected time of arrival of a subsequent master or secondary pulse train and loads this information into latch 15 over lead PRE-TIME under the control of another microprocessor generated signal on the CONTROL input. Comparator 14 compares the signal from clock 7 with the number stored in latch 15 and upon there being a match between these two digital numbers, there is an output from comparator 14 which places flip-flop 30 in logic circuit 16 into its set or one state. The one output of the flip-flop 30 is connected to the reset input R of counter 31 and to one of the two inputs of OR gate 32. Being in its one state the output of flip-flop 30 is high and this is applied via OR gate 32 to the set input S of flip-flop 33 which is thereby placed in its set state with its one output high.

The high one output of flip-flop 30 being supplied to reset input R of counter 31 causes this counter to reset to zero. Once reset to zero, counter 31 counts to a count of 8, stops counting and causes its TC output to go high. The TC output of counter 31 is applied to the reset input R of counter 34 which is disabled from counting once counter 31 reaches a count of eight and is thereby disabled from counting. This occurs because flip-flop 30 being placed in its set state with its one output high enables counter 31 to count by resetting it to zero whereby its TC output goes to zero, thereby removing the signal to the reset input R of counter 34. Counter 34, which is reset to zero count, is thereby enabled to count in response to the 1 MHz signal being input to its clock input CK. Counter 34 is different than counter 31 in that it counts up to its maximum count of 10,000 and then resets itself to zero to recount to 10,000 again and again. Because of counter 34 counting and recounting to 10,000, its output TC has a signal thereat which occurs at a 1,000 microsecond rate due to the dividing action by counter 34 of the 1 MHz signal at its CK input. Thus, counter 34 is providing output signals at the same rate that each of the pulses are being received in the pulse trains from the master and secondary stations. The TC output of counter 34 is applied to the second input of OR gate 32 and is also applied to the clocking input CK of counter 31. This causes the count in counter 31 to be increment by one each time counter 34 counts to 10,000. Thus, at the end of 8,000 microseconds counter 31 will have reached its full count and its output TC is high which, being applied to the reset input R of counter 34, causes counter 34 to be reset to zero and to cease counting. Counter 31 will not be reset to zero until flip-flop 30 is returned to its reset state with its one output low. This happens when output TC goes high, which being connected to reset input R of flip-flop 30, causes it to be reset to its zero state. This removes the high input to reset input R of counter 31, leaving the counter at its full count with its output TC high.

One of the purposes for the timing function accomplished by counters 31 and 34 is to check the phase coding of the pulse trains being received from the selected master and secondary stations. Upon microprocessor 9 changing over the receiver to the fine search mode, the microprocessor parallel loads the phase coding for the first eight pulses of the master and secondary station pulse trains of the selected LORAN-C chain into parallel/serial converter 35 of logic circuit 16. Converter 35 is a conventional shift register well-known in the art which may be loaded in parallel and then shifted out in serial to perform parallel to serial conversion. As is well known in the art, each of the pulses of the pulse trains received from master station and secondary stations has a particular phase coding. This phase coding is stored in microprocessor 9 and is selected by information input to the equipment by the operator using thumbwheel switches 11. It can be seen that the clocking input CK to converter 35 is the same 1,000 microsecond signal output from counter 34. Thus, the contents of converter 35 are serially shifted out at its output Q at a 1,000 microsecond rate. It should be noted that the output Q of converter 35 is connected to one of the two inputs of exclusive OR gate 36 in zero crossing detector 6. Exclusive OR gate 36 functions as an inverter in this case in a manner known to circuit designers. When a particular one of the pulses of the pulse trains received from a master or secondary station is of a positive phase there is no signal or a zero on output Q from converter 35 if the phase codes match. The result is that each radio frequency cycle of the particular pulse which is hard limited by limiter 17 will pass directly through exclusive OR gate 36 to flip-flop 37 unchanged. Upon the expected receipt of each particular pulse of the pulse trains from the master and secondary stations which are to be of a negative phase, converter 35 will have shifted its contents such its output Q will be high or a one. This high input applied to the second input of exclusive OR gate 36 causes OR gate 36 to invert the phase of the pulse output from limiter 17. That is, the signal being input to detector 6 is effectively shifted 180° thereby eliminating the negative phase coding applied to the particular pulse. This is done in order that there will be an output from exclusive OR gate 36 to place flip-flop 37 in its set state at exactly the beginning of each pulse of the pulse trains from the master and secondary stations.

Fiip-flop 37 in detector 6 being placed in its set state with its one output high as described heretofore, causes latch 5 to store the contents of counter 26 at that particular moment in time. Microprocessor 9 thereby receives a time indication of the beginning of each radio frequency cycle of each of the pulses and this information is used to make the required time difference of arrival measurements which are the basis or the LORAN-C system. Flip-flop 37 is returned to its reset state before the beginning of the first cycle of a subsequent pulse received from a master or secondary station by the LATCH RESET signal as described heretofore.

Microprocessor 9 determines the estimated time of arrival of the third cycle positive zero crossing of each of the pulses of the next to be received pulse train from the selected master and secondary stations. Microprocessor 9 then subtracts 35 microseconds from this time which results in a time that should occur five microseconds before the beginning of the first radio frequency cycle of each pulse of the master and secondary station pulse trains. This point in time occurring 5 microseconds before the beginning of each pulse of the pulse trains is output from microprocessor 9 on its output leads PRE-TIME and is input to latch 15 under control of signals from the microprocessor on the input CONTROL. The contents of latch 15 are applied to comparator 14 which is enabled by the microprocessor energizing input E upon the equipment being placed in the fine search mode. It should be noted that comparator 14 also has an input thereto designated REAL TIME, which is the lock output from BCD counter 26 of clock/counter 7 in FIG. 5. Upon there being a match of the two inputs to the comparator 14, there is an output therefrom which places flip-flop 30 in logic circuit 16 into its set state and its one output goes high. As mentioned heretofore, this enables counters 31 and 34 to commence counting as previously described. The one output of flip-flop 30 is also coupled by an OR gate 32 to the set input S of flip-flop 33 to place this flip-flop in its set state with its one output high. As seen in FIG. 6, the one output of flip-flop 33 is connected to the reset inputs of counters 38, 39 and 41, and to the clocking input CK of flip-flop 42, all in logic circuit 16. The purpose of these last listed circuit elements is to help microprocessor 9 analyze each received pulse of the pulse trains from the master and secondary stations to accurately determine the time of arrival of the third cycle positive zero crossing of each pulse.

It can be seen that the clocking input CK to each of counters, 38, 39 and 41 is driven by a clock signal on lead CLK. The source of this clocking signal is the 10 megahertz clock 45 in clock/counter 7 in FIG. 5. Flip-flop 33 being placed in its one state energizes the reset input R of each of counters 38, 39 and 41, thereby resetting these counters to zero and enabling these counters to commence counting. As can be seen in FIG. 6, counter 38 is designated a 30 microsecond counter. This means it counts and provides a signal at its output TC 30 microseconds after this counter is enabled to count. Similarly, counter 39 has an output signal on output TC 2.5 microseconds after this counter is enabled to count. Also, counter 41 has an output signal at output TC 12.5 microseconds after this counter is enabled to count. Thus, 2.5 microseconds after comparator 14 caused flip-flop 30 to be placed in its set state, which thereby causes flip-flop 33 to be placed in its set state, there is an output from counter 39 to the clocking input CK of flip-flop 43 of logic circuit 16. The output TC of counter 39 remains high until its reset input R is deenergized. Similarly, 12.5 microseconds after counter 41 is enabled by resetting there is an output therefrom to the clocking input CK of flip-flop 44. Flip-flop 43 is a D type flip-flop which will store whatever signal is present at its D input upon its clocking input CK being energized. It should be noted that the D input of flip-flop 43, as well as the D input of flip-flops 42 and 44 is obtained from the output of exclusive OR gate 36 in zero-crossing detector 6 in FIG. 5. The output of OR gate 36 is a square wave pulse corresponding to each radio frequency cycle of each pulse of the pulse trains received from the master and secondary LORAN-C stations and also inverted to account for phase coding as previously described.

Counter 39 will time out and cause the clocking input CK of flip-flop 43 to go high at a point in time 32.5 microseconds before the expected arrival of the third cycle positive zero crossing of each pulse. It should be noted that this 32.5 microsecond point occurs 2.5 microseconds before the first cycle of each pulse. At that point in time only noise should be received by the LORAN-C equipment and, more particularly, only noise of a frequency that falls within the 10 kilohertz bandwidth of filter 1. Statistically noise pulses applied to the D input of flip-flop 43 will occur as often as they do not occur. Thus, counter 39 energizing clocking input CK of flip-flop 43 will cause this flip-flop to store either zero's or one's on a proportionally equal basis if the microprocessor 9 has accurately determined the third cycle positive zero crossing and the output signal from counter 39 does occur prior to the beginning of each pulse. The Q output of flip-flop 43, as well as the Q outputs of flip-flops 42 and 44, are coupled via multiplexer 8 to microprocessor 9 as can be seen in FIGS. 6 and 7. Microprocessor 9 receives and stores the output of flip-flop 43 for a total of 2,000 samples and is programmed to average these samples received from flip-flop 43. There will be approximately an equal number of zero's and one's received therefrom if the input to the D input of flip-flop 43 is received prior to any pulse of the pulse trains from the master and secondary stations.

Counter 41 completes its count 12.5 microseconds after it is enabled by the output signal from comparator 14 as previously described. The output from counter 41 occurs 7.5 microseconds after the beginning of the first cycle of each pulse of the pulse trains if microprocessor 9 has accurately determined the position of the third cycle positive zero crossing of each pulse. This point in time will occur during the mid-point of the negative cycle of the first radio frequency cycle of each pulse. Thus, the moment counter 41 energizes clocking input CK of flip-flop 44, the D input of this flip-flop from exclusive OR gate 36 will be a zero. The result is that the Q output of flip-flop 44 will also be a zero which will be forwarded to microprocessor 9 via multiplexer 8 as previously described. Microprocessor 9 also stores each output from flip-flop 44 for 10,000 samples, one per pulse, and is programmed to average these samples to determine if they are predominantly zero representing a negative half cycle.

In the event microprocessor 9 does not initially accurately determine the location of the third cycle positive zero crossing of each pulse of the pulse trains from the master and secondary stations, and this will usually happen upon microprocessor 9 initially switching the LORAN-C equipment into its fine search mode, the outputs from flip-flops 43 and 44 will not be as described immediately hereinabove. When the estimated time is too long, the sample points clocked into flip-flops 43 and 44 by counters 39 and 41 respectively will both occur during each pulse of the pulse trains. As a result, the averages made by microprocessor 9 for flip-flops 43 and 44 will yield positive or negative averages and will not yield a zero average. In response to this condition, microprocessor 9 subtracts 10 microseconds from the estimated time of arrival and the sequence described above is repeated. When the estimated time is too short the averages of the stored samples at the 2.5 microsecond and 12.5 microsecond points will both be zero and microprocessor 9 will add ten microseconds to the estimated time of arrival. This recalculation and repeat of the circuit operation just described is repeated until the output from flip-flop 43 yields a zero average to microprocessor 9 and the output from flip-flop 44 yields a negative average. As microprocessor 9 gets closer to the exact time of arrival, the microprocessor can add or subtract less than 10 microseconds to the calculated time to determine the exact estimated time of arrival figure.

Counter 38, which is also enabled to count upon receipt of the output signal from comparator 14 via flip-flop 33, counts to time a period of 30 microseconds at the end of which it provides an output at its output TC. Output TC from counter 38 is connected to the reset input R of flip-flop 37 in zero-crossing detector 6 and to the reset input R of flip-flop 33. Flip-flop 37 is thereby placed in its reset state with its one output low immediately prior to the receipt of the third cycle positive zero crossing of each received pulse of the pulse trains from the master and secondary stations of the selected LORAN-C chain. The hard limited output from limiter 17 occurring immediately after flip-flop 37 is placed in its reset state is responsive to the third cycle positive zero crossing of each pulse. As a result, the one output of flip-flop 37 goes high in direct correspondence with the leading edge of the hard limited square wave pulse output from limiter 17 and corresponding to the third cycle position zero crossing. As previously described, this causes the count contents of BCD counter 25 to be clocked into latch 5 and indicates the exact time of receipt of the third cycle positive zero crossing of each pulse of the pulse trains. This information is applied via multiplexer 8 to microprocessor 9 as previously described for processing. In response to this information, microprocessor 9 can make the desired time difference of arrival measurements required in LORAN-C equipment. Upon the time difference of arrival measurements being made, microprocessor 9 provides appropriate outputs on its DISPLAY outputs leads which are input to display 12.

The signals output from microprocessor 9 to display 12 are applied to the appropriate digital display units therein. Digital display unit 51 is used to visually display the time difference of arrival information for one selected secondary station, and digital display 52 is used to visually display the time difference of arrival information for a second selected secondary station. The inputs to these digital displays is encoded and is appropriately decoded by anode drivers 46 and 47, anode driver 48 and decoder/drivers 40 and 50 to drive digital displays 51 and 52 respectively. These displays along with their associated decoding and driving circuitry are well known in the art and are commercially available. In this embodiment of my invention, displays 51 and 52 are Itron FG612A1 flourescent displays, but they may also be light emitting diode displays or liquid crystal displays, or any other form of visual display.

To select the secondary stations, the time difference of arrival measurements for which are to be displayed on displays 51 and 52, thumbwheel switches 61 and 62 are provided. Switch 61 is physically adjacent to display 51 and one of the numbers "1" to "4" are selected with this switch to indicate to processor 9 the information to be displayed. Similarly, thumbwheel switch 62 is associated with display 52 and is used by the equipment operator to indicate the particular secondary station arrival measurement to be displayed on display 52. Switch 11 shows no details but is made up of right individual switch such as represented by switch 61 in FIG. 7. The operation of a detented thumbwheel brings numbers into a window and output terminals of the switch indicates the chosen number.

A signal to noise button 62 is also located on the front panel of the equipment which while depressed by the operator causes the existing display on displays 51 and 52 to be replaced by a signal to noise figure for the same secondary stations indicated by the position of the corresponding ones of switches 61 and 62. Microprocessor 9 is programmed to calculate the signal to noise figures to be displayed and responds to the operation of button 62 to change the display on displays 51 and 52. To make this signal to noise ratio check, microprocessor 9 stores fourteen-thousand samples of the first negative half cycle of each pulse as indicated by counter 41 described in detail hereinabove. As is easily understood, pure noise would yield seven-thousand detected negative half cycles and seven thousand positive half cycles, and a perfect signal would yield fourteen thousand detected negative half cycles. Accordingly, numbers between seven thousand and fourteen thousand indicate the signal to noise ratio with this ratio getting higher as the count of detected negative half cycles increases toward the sample number of fourteen thousand. It is numbers between seven thousand and fourteen thousand that will be displayed on displays 51 and 52 when signal/noise button 62 on the front panel is operated.

It can readily be seen that microprocessor 9 can be programmed to display numbers from 0 to 100 corresponding to the range of seven thousand to fourteen thousand by using a simple interpolation algorithm. Any other number scheme may also be used to indicate signal to noise.

While that which has been described hereinabove is at present considered to be the preferred embodiment of the invention, it is illustrative only, and the rapid changes in technology will make various changes and modifications obvious to those skilled in the art without departing from the scope of the invention as claimed below.

Thus, for example, programming may be added to the microprocessor and the keyboard may be used or input and the display as output to perform calculations of all kinds, or the display may, in addition, be used to provide a digital clock with day, date and other information. In another variation the microprocessor may provide navigation instructions via the display.

I claim:

1. A navigation receiver-indicator providing navigation information by receiving and measuring differences in the time of arrival of coded radio signals received from a plurality of navigation transmitters, in groups of transmitters, comprising:

means for selecting a group of transmitters to be used for said time difference of arrival measurements, first logic means processing said radio signals as they are received for determining when received signals are properly coded indicating they are from said navigation transmitters, and providing output indications of same, processor means storing and analyzing said output indications from said first logic means to determine when received radio signals are from transmitters of a group of transmitters selected using said selecting means, and second logic means enabled by and functioning with said processor means after said processor means has determined that received radio signals are from said selected group of transmitters to calculate the time of reception of subsequently received radio signals and then to analyze said last-mentioned radio signals to thereby locate a specific point of said last-mentioned radio signals used by said processor means to accurately measure the difference in time arrival of said radio signals from individual transmitters of said selected group of transmitters and provide a visual output of said measurements to provide navigation information.

2. The invention in accordance with claim 1 wherein said processor means receives feedback information from said second logic means that enables said processor means to revise said calculated time of radio signal reception to accurately make said time difference measurements.

3. The invention in accordance with claim 2 wherein a plurality of said output indications for said selected stations are stored within said processor means which is programmed to take an average of said output indications to calculate the time of reception of said radio signals subsequently received from each of said selected group of transmitting stations.

4. The invention in accordance with claim 3 wherein said feedback signals received by said processor means from said second logic means are stored in said processor means which takes an average of said feedback signals to properly determine if said calculated time of arrival of said radio signals is correct or needs revision before making said radio signal time difference of arrival measurements to obtain said navigation information.

5. The invention in accordance with claim 4 wherein said transmitters are arranged in groups consisting of one master transmitting station and a plurality of secondary transmitting stations, wherein the radio signals transmitted by each of said master and secondary stations comprises a series of pulses in a pulse train with the pulse train transmitted by a master station differing from the pulse train transmitted by a secondary station to distinguish the two types of stations, wherein said time difference of signal arrival measurements are always made between the time of arrival of signals from a master station and selected ones of said secondary stations, and wherein said first logic means comprises, a multistage shift register used for storing pulses of the pulse chains as they are received from said master and secondary station transmitters, and third logic means connected to various of said stages of said shift register to analyze a pulse chain stored therein to determine if it is from a master or a secondary station and provide an appropriate indication of said analysis to said processor means.

6. The invention in accordance with claim 5 wherein individual pulses of said transmitted pulse trains are phase coded, phase codes for different master and secondary transmitting stations being stored in said processor means, and phase code correction apparatus is provided wherein said phase codes for the sequentially received signals from master and secondary stations of said selected group of transmitters are input to said correction apparatus and used to remove the phase coding from said sequentially received signals before utilizing said received radio signals to make said time difference of arrival measurements.

7. The invention in accordance with claim 6 wherein the transmitters of each group of navigation transmitters all transmit their pulse trains at a predetermined repetitive rate peculiar to each group and wherein said selecting means is manually operable to indicate the repetitive rate of a selected group of transmitters to said processor means which utilizes said rate indication to first identify signals received from said selected group of transmitters and then to calculate the subsequent time of reception of said radio signals from said selected group transmitters.

8. The invention in accordance with claim 7 wherein said navigation receiver-indicator further comprises, a display functioning with said processor means to provide a visual display of said time difference of signal arrival measurements used for navigation, and means for indicating to said processor means particular ones of said secondary stations with respect to which said time difference of signal arrival measurements should be made.

9. The invention in accordance with claim 6 wherein said processor means generates an enable timing signal upon calculating the time of reception of subsequently received radio signals from a selected group of navigation transmitters and wherein said second logic means comprises means enabled by said enable timing signal for generating timing signals which cause samples of any received signals to be input to said processor means which stores a plurality of said samples and amplitude averages same for analyzation to determine if said calculated time of signal reception is correct to locate said specific point of said radio signals from which said time difference of signal arrival measurements are made to derive navigation information.

10. The invention in accordance with claim 9 wherein said processor means generates an enable timing signal upon calculating the time of reception of subsequently received radio signals, and wherein said timing signal generating means comprises:

first timing means enabled by said enable timing signal to provide a first timing signal causing a first sample of any signals received by said navigation receiver to be input to said processor means which stores a plurality of said first signal samples and amplitude averages same, said average being zero when said signal samples are taken outside of said pulses, second timing means enabled by said enable timing signal to provide a second timing signal causing a second sample of any received signals to be input to said processor means which stores a plurality of said second samples and amplitudes averages same, said second sample average being other than zero when said second sample is taken during receipt of any one of said pulses, and third timing means enabled by said enable timing signal to provide a third timing signal causing a third sample of any received signals to be input to said processor means which stores a plurality of said third samples and amplitude averages same, said third sample average being other than zero when said third sample is taken during any one of said pulses, and from said first, second and third samples said processor means determines if said calculated time of arrival of said radio signals is correct and said processor means revises said calculated time until predetermined pulse parameters are located from which said specific point may be located to make said time difference of signal arrival measurements.

11. The invention in accordance with claim 1 wherein said processor means stores the results of the analyzation of said radio signals made by said second logic means for a plurality of samples and said processor means is programmed to derive signal to noise ratio information from stored plurality of stored samples.

12. The invention in accordance with claim 11 wherein said processor means stores said analyzation samples as binary zeros and ones with pure noise input to said navigation receiver-indicator resulting in an equal number of binary zeros and ones from said plurality of samples and pure signals from said navigation transmitters input to said receiver-indicator resulting in all binary ones from said plurality of samples, and responsive to the number of zeros and ones in said plurality of samples, said microprocessor means causes a visual output to be given indicating said signal to noise ratio.

13. A method for deriving position information for navigation purposes by making measurements of the time period between receipt of periodic signals in pulse trains from a selected first or master transmitting station and selected ones of a plurality of secondary transmitting stations associated with said master station in a navigation system comprising the steps of:

analyzing the makeup of each pulse train as it is being received to determine if it is from a master or secondary station, storing an indication of the time of receipt of each pulse train along with an indication whether it is from a master or secondary station, said stored indications being used to identify said selected master station and its associated secondary stations, calculating the time of receipt of signals subsequently received from said selected master station and said secondary stations after determining which periodic signals are received therefrom, analyzing each signal received at the indicated times of arrival from said selected master station and said secondary stations to determine if the indicated time of arrival is correct and to modify said indicated times of arrival if necessary to locate a specific point in each of said periodic signals, measuring the difference in time of arrival between the specific point of each of the periodic signals received from said master station and each of the selected secondary stations, and providing an output reflecting said time difference of signal arrival measurement used for navigation purposes.

14. The method of deriving position information for navigation purposes in accordance with claim 13 wherein said step of calculating the time of receipt of said signals comprises the step of analyzing said stored indications of time of receipt of pulse trains by averaging the stored time indications for said selected master station and its associated secondary stations to determine the average of the time of arrival of said signal pulse trains.

15. The method of deriving position information for navigation purposes in accordance with claim 13 further comprising the step of checking phase coding of each pulse of the signal pulse trains received from each of the selected master stations and its associated secondary stations with stored phase code information to determine if the received pulse train from each of the master and secondary stations is a sky wave reflected from the ionosphere which pulse train is to be disregarded.

16. The method of deriving navigational position information in accordance with claim 15 further comprising the steps of removing the phase coding from the pulses of said pulse trains received from said selected master station and its associated secondary stations prior to storing the indication of time of receipt of each pulse train in order to achieve accurate measurements of the time period between receipt of signals from said selected master station and each of said selected secondary stations.

17. The method of deriving position information for navigation purposes in accordance with claim 13 further comprising the steps of storing the polarity characteristic at a discrete point on each of said periodic signals received from said selected master station and from its associated secondary stations for a plurality of samples, and providing an indication of the number of times a particular polarity occurs in said plurality of samples from each of said last mentioned stations to provide an indication of the signal to noise ratio of said signals received from said last-mentioned stations.

* * * * *